(12) United States Patent
Murao et al.

(10) Patent No.: US 6,607,156 B2
(45) Date of Patent: Aug. 19, 2003

(54) MAGNETIC TAPE CASSETTE

(75) Inventors: Naoto Murao, Kanagawa (JP); Hiroaki Araki, Kanagawa (JP); Tomohiro Ichikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/124,326

(22) Filed: Apr. 18, 2002

(65) Prior Publication Data
US 2003/0062438 A1 Apr. 3, 2003

(30) Foreign Application Priority Data

Apr. 18, 2001 (JP) .......................................... 2001-119618

(51) Int. Cl.[7] .............................................. G11B 23/04
(52) U.S. Cl. .................................................. 242/346.2
(58) Field of Search .......................... 242/346.2, 615.2, 242/615.4; 360/132

(56) References Cited

U.S. PATENT DOCUMENTS

| | | | | |
|---|---|---|---|---|
| 5,479,311 A | * | 12/1995 | Doushita et al. | |
| 5,914,840 A | * | 6/1999 | Kawakami et al. | |
| 5,976,668 A | * | 11/1999 | Chiba et al. | |
| 6,468,627 B2 | * | 10/2002 | Ono et al. | |

* cited by examiner

Primary Examiner—William A. Rivera
(74) Attorney, Agent, or Firm—Sughrue Mion, PLLC

(57) ABSTRACT

A 2 reel type data storage magnetic tape cassette (20) is provided with reels (28, 30) around which a magnetic recording medium (26) is wound. The magnetic recording medium (26) includes a support, a non-magnetic layer comprising a non-magnetic powder and a binder on one surface of the support, a magnetic layer comprising a ferromagnetic metal powder and a binder on top of the non-magnetic layer, and a back layer comprising a carbon black powder and a binder on the other side of the support. The magnetic tape cassette (20) is further provided with a rotating guide roller (36) made of a resin within the cassette (20). The rotating guide roller (36) has a ten-point average roughness Rz of 3.0 to 4.5 $\mu$m and is in contact with the surface of the magnetic layer having a center plane average roughness SRa of 2.0 to 3.5 nm.

18 Claims, 1 Drawing Sheet

MAGNETIC TAPE CASSETTE

BACKGROUND OF THE INVENTION

1. Field of the Invention

The present invention relates to a magnetic tape cassette that houses a coated high-recording-density magnetic recording medium. More specifically, it relates to a magnetic tape cassette that houses a magnetic recording medium for high-density recording, the magnetic recording medium comprising a lower layer and an upper layer on top thereof, the lower layer including a non-magnetic powder and a binder, and the upper layer including a ferromagnetic metal powder.

2. Description of the Related Art

In the field of broadcasting, a single-layer, coated metal tape that employs a ferromagnetic metal powder, and a multi-layer metal tape, in which the thickness of a magnetic layer is reduced so as to increase the output by simultaneously coating with a non-magnetic layer, have been used. Because of the prevalence of high-quality broadcasting such as Hi-Vision broadcasting or digital terrestrial broadcasting, there is a desire for a recording medium having a higher recording density than that of conventional media. In the field of data storage also, the amount of information to be handled has rapidly increased, and a rotating head system, which has been employed in the broadcasting field, is now in demand. In this data storage field there is also a desire for a backup tape having a similar high recording density and high reliability to that in the field of broadcasting.

Under such circumstances, in order to increase the linear recording density of a recording medium, the surface of the magnetic layer has become increasingly smooth, resulting in concerns about a degradation in transport durability due to an increase in the coefficient of friction. Furthermore, if an attempt is made to increase the capacity by reducing the volume recording density, a reduction in the layer thickness of the recording medium cannot be avoided, resulting in concerns about a degradation in the durability, such as edge folding, due to a decrease in the tape strength. In other words, in order to achieve a high recording density it is essential to improve the durability.

Moreover, since the unit recording area decreases, there is a possibility that fine foreign matter on the magnetic surface, which had not previously caused a problem, might cause recording dropouts, etc. When an error such as a dropout occurs during recording in a data storage system, recording is carried out again on another area on the tape (hereinafter called a 'retry'), thus preventing the information from being missed. When the number of retries increases due to the presence of foreign matter on the tape, the transfer rate of the system rapidly decreases.

That is to say, in both the broadcasting and data storage fields there is a demand for a magnetic tape cassette housing a magnetic recording medium having a high recording density, excellent durability and high reliability.

BRIEF SUMMARY OF THE INVENTION

The present invention has been carried out in view of the above-mentioned circumstances.

It is an object of the present invention to provide a magnetic tape cassette housing a high-recording-density magnetic recording medium having high output and an extremely small number of retries.

An aspect of the present invention relates to a 2 reel type data storage magnetic tape cassette that comprises a reel around which a magnetic recording medium is wound. The magnetic recording medium comprises a support, a non-magnetic layer comprising a non-magnetic powder and a binder on one surface of the support, a magnetic layer comprising a ferromagnetic metal powder and a binder on top of the non-magnetic layer, and a back layer comprising a carbon black powder and a binder on the other side of the support. The magnetic tape cassette further comprises a rotating guide roller made of a resin within the cassette. The rotating guide roller has a ten-point average roughness Rz of 3.0 to 4.5 $\mu$m and is in contact with the surface of the magnetic layer having a center plane average roughness SRa of 2.0 to 3.5 nm.

The above-mentioned object, other objects, features, and advantages of the invention will become clear from the following description.

DETAILED DESCRIPTION OF THE INVENTION

Figure 1:
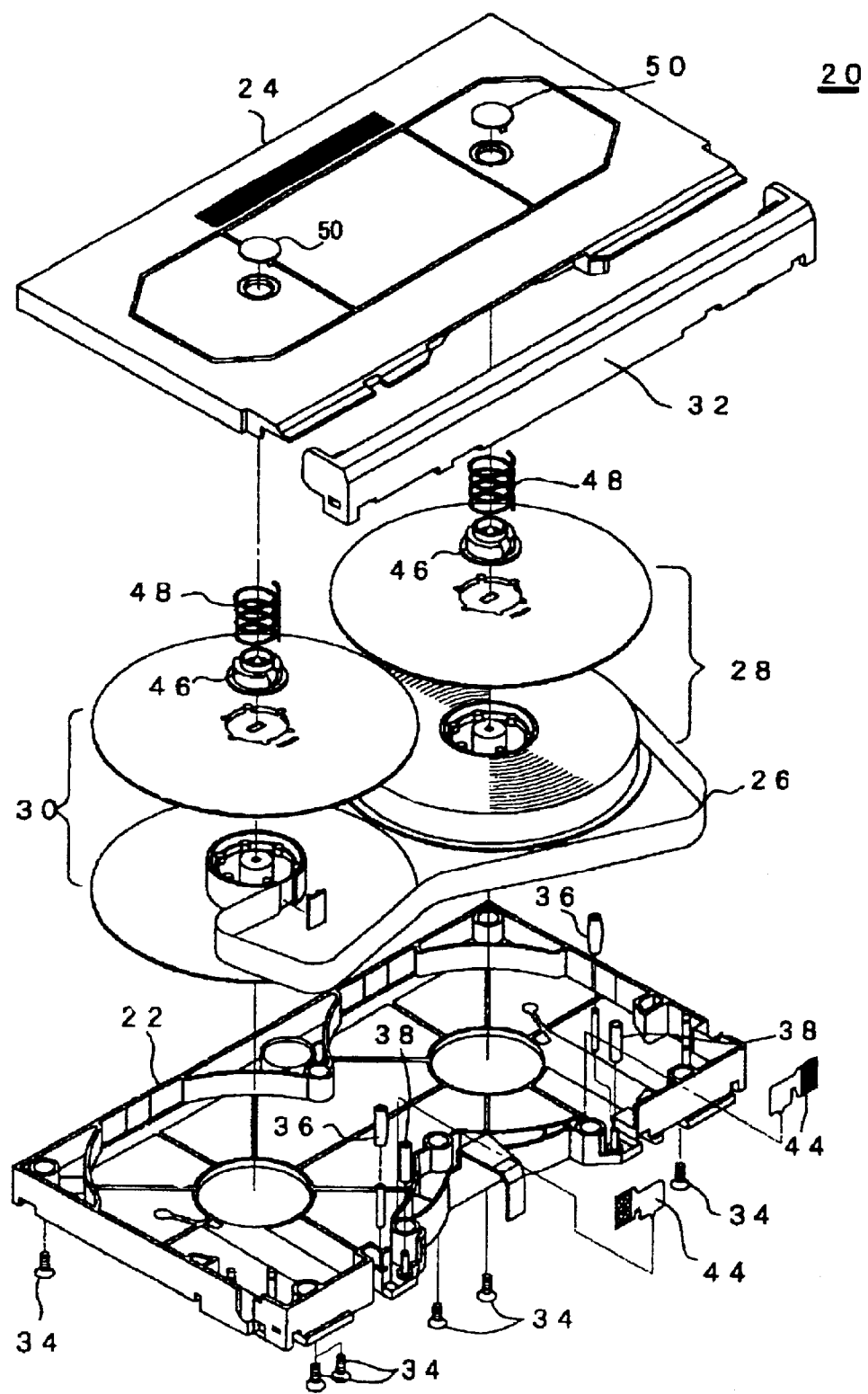
FIG. 1 is an exploded perspective view of the main components of a BETACAM L Cassette, which is a magnetic cassette tape for commercial use, as one embodiment of the present invention.

With regard to a magnetic tape cassette housing a magnetic recording medium of the present invention, in order to increase the output and improve the transport durability, it is necessary for the coefficient of friction between a magnetic surface and a rotating guide roller that is in contact with the magnetic surface within the cassette to be equal to or less than a predetermined level.

The above-mentioned rotating guide roller is usually arranged by movably fitting a central hole formed in the rotating guide roller around a bearing pin made of metal that has been projectingly press-fitted into a hole formed in a lower half of the cassette. Since it is difficult to form the above-mentioned bearing pin so that it is exactly perpendicular to the base of the lower half, it is inevitably formed so that it has an inclination in the range of ±0.8 degrees. This inclination causes the rotating guide roller to also have a similar degree of inclination. When there is a high coefficient of friction between the surface of such an inclined rotating guide roller and the surface of the magnetic layer that it is in contact with, the tape is pulled in the direction in which the rotating guide roller is inclined, and the tape edge is abraded intensively, thereby generating debris (powder fall) and increasing the number of system retries. In the worst case, the debris adheres to the gap of a recording head, thus causing clogging.

Examples of a method for controlling the coefficient of friction include subjecting the surface of the rotating guide roller to cutting machining, etc. so as to increase the surface roughness, and machining grooves in the surface of the rotating guide roller at constant intervals in a direction perpendicular to the rotational direction, and it is thus possible to control the coefficient of friction so that it is low. It should, however, be noted that more than a certain degree of roughening of the surface of the rotating guide roller can cause scratching on the magnetic surface.

The ten-point average roughness Rz of the rotating guide roller referred to in the present invention is a value that can be obtained by measuring the surface of the rotating guide roller in the direction of its axis of rotation by means of a probe-type surface roughness meter. Details of the measurement method is defined in JIS B0601.

The center plane average roughness SRa of the magnetic layer referred to in the present invention can be measured using an optical interference type surface roughness meter (an HD-2000 digital optical profiler manufactured by Wyko Corporation). A surface to be measured (the surface of a magnetic layer of a magnetic recording tape) is measured under conditions of a ×50 object lens, a ×0.5 intermediate lens, and a measurement area of 242 μm×184 μm, and basic data is obtained by applying inclination correction and cylinder correction to the measurement results. The center plane average roughness SRa (unit: nm) is calculated from this basic data.

Conventionally, magnetic tape cassettes housing a magnetic recording medium are widely used as recording media. These magnetic tape cassettes can be classified according to their intended purpose into those for consumer use and those for commercial use. FIG. 1 is an exploded perspective view of the main components of a BETACAM L cassette, which is a magnetic tape cassette for commercial use, as one embodiment of the present invention.

As shown in FIG. 1, this BETACAM L cassette (hereinafter, simply called a 'cassette') 20 mainly comprises an upper half 24 and a lower half 22, a pair of supply and take-up reels 28 and 30, and a lid 32. The upper and lower halves 24 and 22 form a cassette case. The supply and take-up reels 28 and 30 are rotatably housed within the upper and lower halves 24 and 22, and a magnetic tape 26 is wound around the supply and take-up reels 28 and 30. The lid 32 covers an opening on the front side of the upper and lower halves 24 and 22 so that the opening can be covered and uncovered.

In addition to the above-mentioned components, the cassette 20 is equipped with a plurality of screws 34, a pair of guide rollers 36, a pair of guide pins 38 made of metal, etc. The screws 34 join the upper and lower halves 24 and 22 together. The guide rollers 36 and the guide pins 38 are disposed in the openings for tape supply and take-up within the lower half 22. Furthermore, in the figure the numeral 46 denotes a reel holder disposed on top of each of the tape reels 28 and 30, 48 denotes a reel spring for biasing each of the tape reels 28 and 30 via the corresponding reel holder 46, and 50 denotes a center cap on the upper side of the upper half 24 for retaining the reel spring 48. The magnetic tape fed out of the tape supply reel is wrapped firstly around the guide roller 36 so that the magnetic layer is in contact with the guide roller 36 and then around the guide pin 38 so that the back side (a back layer is usually provided, and therefore the surface of the back layer) of the magnetic tape is in contact with the guide pin 38; immediately before it is taken up by the take-up reel, it is wrapped around the guide pin 38 provided in the vicinity of the take-up reel so that the back side of the magnetic tape is in contact with the guide pin 38 and then around the guide roll 36 so that the magnetic layer is in contact with the guide roll 36.

A pad 44 has its side surface in sliding contact with the back side of the magnetic tape 26 running past between the guide roller 36 and the guide pin 38 at the end of each of the openings, and applies a moderate pressure to the magnetic tape 26. The magnetic tape 26 pulled out of the cassette 20 is wrapped around a head (not illustrated) while being guided by various types of guide pin (not illustrated) on a recording/playback device side, and is supplied and taken up in response to the rotation of a capstan motor.

Among the above-mentioned various components, the guide roller 36 is formed from a resin having lubrication properties and mechanical strength such as, for example, polyoxymethylene (POM), and can be formed by a conventionally known method such as a production method involving cutting a resin rod by means of a machine or a production method involving injection molding. The guide roller 36 is for ensuring the stable transport of the magnetic tape 26 as well as for guiding it efficiently, and is rotatably supported by movably fitting, into its central hole, a bearing pin projectingly provided in the lower half 24.

In the present invention, the ten-point average roughness Rz of the guide roller is set so as to be in the range of 3.0 to 4.5 μm.

Magnetic Layer

In the present invention, a non-magnetic layer (hereinafter, also called a 'lower layer') and a thin magnetic layer (hereinafter, also called an 'upper layer' or an 'upper magnetic layer') are provided on both sides or one side of a support. The upper and lower layers can be provided by coating the lower layer, and then providing the upper magnetic layer either while the lower layer is in a wet state (Wet on Wet) or after it has been dried (Wet on Dry).

Ferromagnetic Metal Powder

With regard to a ferromagnetic metal powder used in the present invention, a ferromagnetic alloy powder having α-Fe as a main component is preferable. These ferromagnetic metal powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, Sm, P, Co, Mn, Zn, Ni, Sr and B. In particular, it is preferable for the powder to contain, in addition to α-Fe, at least one chosen from Al, Si, Ca, Y, Ba, La, Nd, Sm, Co, Ni and B, and more preferably at least one of Co, Y, Al, Nd and Sm. The Co content is preferably 0 to 40 atom % relative to Fe, more preferably 5 to 35 atom %, and yet more preferably 10 to 35 atom %. The Y content is preferably 1.5 to 12 atom %, more preferably 3 to 10 atom %, and yet more preferably 3 to 9 atom %. The Al content is preferably 1.5 to 13 atom %, more preferably 3 to 11 atom %, and yet more preferably 4 to 10 atom %. These ferromagnetic metal powders may be treated in advance, prior to dispersion, with a dispersant, a lubricant, a surfactant, an antistatic agent, etc. Details are described in JP-B-44-14090 (JP-B denotes Japanese examined patent application publication), JP-B-45-18372, JP-B-47-22062, JP-B-47-22513, JP-B-46-28466, JP-B-46-38755, JP-B-47-4286, JP-B-47-12422,JP-B-47-17284, JP-B-47-18509, JP-B-47-18573, JP-B-39-10307, JP-B-46-39639, U.S. Pat. Nos. 3,026,215, 3,031,341, 3,100, 194, 3,242,005, and 3,389,014, etc.

The ferromagnetic metal powder may contain a small amount of a hydroxide or an oxide. The ferromagnetic metal powder can be obtained by a known production method, which can be exemplified by the following methods. There are a method involving reduction of a composite organic acid salt (mainly an oxalate) with a reducing gas such as hydrogen, a method in which iron oxide is reduced with a reducing gas such as hydrogen to give Fe or Fe-Co particles, a method involving thermolysis of a metal carbonyl compound, a method involving reduction by the addition of a reducing agent such as sodium borohydride, a hypophosphite, or hydrazine to an aqueous solution of a ferromagnetic metal, a method in which a fine powder is obtained by vaporizing a metal in a low pressure inert gas, etc. The ferromagnetic metal powder thus obtained can be subjected to a known slow oxidation process, that is to say, it can be treated by any one of a method in which it is immersed in an organic solvent and then dried, a method in which after it is immersed in an organic solvent an oxygen-containing gas is fed in so as to form an oxidized film on the surface and it is then dried, and a method in which an oxidized film is formed on the surface by adjusting the partial pressures of oxygen gas and an inert gas without using an organic solvent.

The BET specific surface area of the ferromagnetic metal powder used in the magnetic layer of the present invention is 45 to 80 m$^2$/g, and preferably 50 to 70 m$^2$/g. When it is less than 45 m$^2$/g, the noise increases, and when it exceeds 80 m$^2$/g, it becomes difficult to obtain surface smoothness, which is undesirable. The crystallite size of the ferromagnetic metal powder used in the magnetic layer of the present invention is 80 to 180 Å, preferably 100 to 180 Å, and more preferably 110 to 175 Å. The average length of the major axis of the ferromagnetic metal powder is preferably 30 to 150 nm, and more preferably 30 to 100 nm. The acicular ratio of the ferromagnetic metal powder is preferably 3 to 15, and more preferably 5 to 12. The Hc of the ferromagnetic metal powder is usually 155 to 239 kA/m (1950 to 3000 Oe), and preferably 159 to 223 kA/m (2000 to 2800 Oe). The saturation magnetization ($\sigma_s$) of the ferromagnetic metal powder is 100 to 200 A·m$^2$/kg (100 to 200 emu/g), and preferably 120 to 180 A·m$^2$/kg (120 to 180 emu/g).

The water content of the ferromagnetic metal powder is preferably set at 0.01 to 2 wt %. The water content of the ferromagnetic metal powder is preferably optimized according to the type of binder. The pH of the ferromagnetic metal powder is preferably optimized according to the binder used in combination therewith. The pH is usually in the range of 4 to 12, and preferably from 6 to 10. The ferromagnetic metal powder may be subjected to a surface treatment with Al, Si, P, or an oxide thereof, if necessary. The amount thereof is usually 0.1 to 10 wt % relative to the ferromagnetic metal powder, and the surface treatment can suppress adsorption of a lubricant such as a fatty acid to 100 mg/m$^2$ or below, which is preferable. The ferromagnetic metal powder might contain soluble inorganic ions such as Na, Ca, Fe, Ni or Sr ions in some cases. It is preferable for them to be substantially absent, but their presence at 200 ppm or below does not particularly affect the characteristics. The ferromagnetic metal powder used in the present invention preferably has few pores, and the level thereof is 20 vol % or below, and more preferably 5 vol % or below. The form of the ferromagnetic metal powder may be any of acicular, rice-grain shaped and spindle-shaped as long as the characteristics of the particle size described above are satisfied. The SFD (switching field distribution) of the ferromagnetic metal powder itself is preferably as low as 0.8 or below. It is also necessary to narrow the Hc distribution of the ferromagnetic metal powder. When the SFD is 0.8 or below, the electromagnetic conversion characteristics become good, the output becomes high, the magnetization reversal becomes sharp with a suppressed peak shift, and it is suitable for high-recording-density digital magnetic recording. The Hc distribution of the ferromagnetic metal powder can be narrowed by improving the goethite particle size distribution, preventing sintering, etc.

Lower Layer

Next, the lower layer is explained in detail. The lower layer of the present invention comprises at least a resin, and is preferably one in which a powder, for example, an inorganic powder or an organic powder has been dispersed in a resin. The inorganic powder is usually preferably a non-magnetic powder, but a magnetic powder may be mixed therewith in a range that does not substantially affect the electromagnetic conversion characteristics.

Examples of the non-magnetic powder include inorganic compounds such as a metal oxide, a metal carbonate, a metal sulfate, a metal nitride, a metal carbide and a metal sulfide. As the inorganic compound, α-alumina with an α-component proportion of at least 90%, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. can be used singly or in combination. Particularly preferable in terms of a narrow particle size distribution, the possibility of having many means for imparting functionality, etc., are titanium dioxide, zinc oxide, iron oxide and barium sulfate, and more preferable are titanium dioxide and α-iron oxide. The average particle size of such a non-magnetic powder is preferably 0.005 to 2 μm, but it is also possible, as necessary, to combine non-magnetic powders having different particle sizes or widen the particle size distribution of a single non-magnetic powder, thus producing the same effect. The average particle size of the non-magnetic powder is particularly preferably 0.01 to 0.2 μm. In particular, when the non-magnetic powder is a grain-shaped metal oxide, the average particle size is preferably 0.08 μm or below. When it is an acicular metal oxide, the average length of the major axis is preferably 0.3 μm or below, and more preferably 0.2 μm or below. The tap density is 0.05 to 2 g/ml, and preferably 0.2 to 1.5 g/ml. The water content of the non-magnetic powder is 0.1 to 5 wt %, preferably 0.2 to 3 wt %, and more preferably 0.3 to 1.5 wt %. The pH of the non-magnetic powder is usually 2 to 11, and particularly preferably in the range of 3 to 10. The specific surface area of the non-magnetic powder is 1 to 100 m$^2$/g, preferably 5 to 80 m$^2$/g, and more preferably 10 to 70 m$^2$/g. The crystallite size of the non-magnetic powder is preferably 0.004 to 1 μm, and more preferably 0.04 to 0.1 μm. The oil absorption measured using DBP (dibutyl phthalate) is 5 to 100 ml/100 g, preferably 10 to 80 ml/100 g, and more preferably 20 to 60 ml/100 g. The specific gravity is 1 to 12, and preferably 3 to 6. The form may be any one of acicular, spherical, polyhedral, and tabular. The Mohs hardness is preferably in the range of 4 to 10. The amount of SA (stearic acid) absorbed by the non-magnetic powder is 1 to 20 μmol/m$^2$, preferably 2 to 15 μmol/m$^2$, and more preferably 3 to 8 μmol/m$^2$. The surface of the non-magnetic powder is preferably subjected to a surface treatment so that $Al_2O_3$, $SiO_2$, $TiO_2$, $ZrO_2$, $SnO_2$, $Sb_2O_3$, ZnO or $Y_2O_3$ is present. In terms of dispersibility in particular, $Al_2O_3$, $SiO_2$, $TiO_2$, and $ZrO_2$ are preferable, and $Al_2O_3$, $SiO_2$, and $ZrO_2$ re more preferable. They may be used in combination or singly. Depending on the intended purpose, a surface-treated layer may be obtained by co-precipitation, or a method in which alumina is firstly made present and then silica is made present on the surface thereof, or vice versa, can be employed. The surface-treated layer may be formed as a porous layer depending on the intended purpose, but it is generally preferable for it to be uniform and dense.

Specific examples of the non-magnetic powder used in the lower layer of the present invention include Nanotite (manufactured by Showa Denko K.K.), HIT-100 and ZA-G1 (manufactured by Sumitomo Chemical Co., Ltd.), α-hematite DPN-250, DPN-250BX, DPN-245, DPN-270BX, DPN-500BX, DBN-SA1, and DBN-SA3 (manufactured by Toda Kogyo Corp.), titanium oxide TTO- 51 B, TTO-55A, TTO-55B, TTO-55C, TTO-55S, TTO-55D, SN-100, α-hematite E270, E271, E300, and E303 (manufactured by Ishihara Sangyo Kaisha Ltd.), titanium oxide STT-4D, STT-30D, STT-30, STT-65C, and α-hematite α-40 (manufactured by Titan Kogyo Kabushiki Kaisha), MT-100S, MT-100T, MT-150W, MT-500B, MT-600B, MT-100F, and MT-500HD (manufactured by Tayka Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), and 100A, 500A and calcined products thereof (manufactured by Ube Industries, Ltd.). Particularly preferred non-magnetic powders are titanium dioxide and α-iron oxide.

Incorporation of carbon black into the lower layer can give the known effects of a lowering of surface electrical resistance (Rs) and a reduction in light transmittance. Types of carbon black that can be used include furnace black for rubber, thermal black for rubber, black for coloring, and acetylene black. The carbon black used in the lower layer should have characteristics that have been optimized as follows according to a desired effect, and the effect can be increased by the use thereof in combination.

The specific surface area of the carbon black used in the lower layer is generally 100 to 500 m$^2$/g, and preferably 150 to 400 m$^2$/g, and the DBP oil absorption thereof is generally 20 to 400 ml/100 g, and preferably 30 to 400 ml/100 g. The average particle size of the carbon black is generally 5 to 80 nm, preferably 10 to 50 nm, and more preferably 10 to 40 nm. The pH thereof is preferably 2 to 10, the water content thereof is preferably 0.1 to 10 wt %, and the tap density is preferably 0.1 to 1 g/ml. Specific examples of the carbon black used in the present invention include BLACK-PEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA-600, MA-230, #4000 and #4010 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbia Carbon Co.), and Ketjen Black EC (manufactured by AKZONOBEL). The carbon black may be subjected to any of a surface treatment with a dispersant, etc., grafting with a resin, or a partial surface graphitization. The carbon black may also be dispersed in a binder prior to addition to a coating solution. The carbon black can be generally used in a range not exceeding 50 wt % based on the above-mentioned inorganic powder and not exceeding 40 wt % of the total weight of the non-magnetic layer. The carbon black can be used alone or in a combination of different types thereof. The carbon black that can be used in the present invention can be chosen from, for example, those described in the 'Carbon Black Handbook' (edited by the Carbon Black Association of Japan).

The lower layer can contain also an organic powder according to the intended purpose. Examples of the organic powder include a styrene-acrylic resin powder, a benzoguanamine resin powder, a melamine resin powder, and a phthalocyanine pigment. It is also possible to use a polyolefin resin powder, a polyester resin powder, a polyamide resin powder, a polyimide resin powder, or a polyethylene fluoride resin powder. They can be produced by methods such as those disclosed in JP-A-62-18564 (JP-A denotes Japanese unexamined patent application publication) and JP-A-60-255827.

The types and quantities of a binder resin, a lubricant, a dispersant, and an additive used in the lower layer, a solvent, and a dispersion method can be determined according to known techniques relating to the magnetic layers.

Binder

A conventionally known thermoplastic resin, thermosetting resin, reactive resin or a mixture thereof is used as a binder in the present invention. The thermoplastic resin has a glass transition temperature of −100° C. to 150° C., a number-average molecular weight of 1,000 to 200,000, and preferably 10,000 to 100,000, and a degree of polymerization of the order of 50 to 1,000.

Examples thereof include polymers and copolymers containing as a repeating unit vinyl chloride, vinyl acetate, vinyl alcohol, maleic acid, acrylic acid, an acrylate ester, vinylidene chloride, acrylonitrile, methacrylic acid, a methacrylate ester, styrene, butadiene, ethylene, vinyl butyral, vinyl acetal and vinyl ether; polyurethane resins, and various types of rubber resins. Examples of the thermosetting resin and the reactive resin include phenol resins, epoxy resins, curable type polyurethane resins, urea resins, melamine resins, alkyd resins, reactive acrylic resins, formaldehyde resins, silicone resins, epoxy-polyamide resins, mixtures of a polyester resin and an isocyanate prepolymer, mixtures of a polyester polyol and a polyisocyanate, and mixtures of a polyurethane and a polyisocyanate. Details of these resins are described in the 'Plastic Handbook' published by Asakura Shoten.

It is also possible to use a known electron beam curable type resin in each of the layers. Examples of the resin and a production method therefor are disclosed in detail in JP-A-62-256219. The above-mentioned resins can be used alone or in combination. Combinations of a polyurethane resin with at least one selected from a vinyl chloride resin, a vinyl chloride-vinyl acetate copolymer, a vinyl chloride-vinyl acetate-vinyl alcohol copolymer, and a vinyl chloride-vinyl acetate-maleic anhydride copolymer, and combinations thereof with a polyisocyanate are preferred.

The structure of the polyurethane resin can be a known one such as polyester polyurethane, polyether polyurethane, polyether polyester polyurethane, polycarbonate polyurethane, polyester polycarbonate polyurethane, or polycaprolactone polyurethane. For the purpose of further improving the dispersibility and durability, the above-mentioned binders may preferably be incorporated, if necessary, by copolymerization or by an addition reaction, with at least one polar group selected from —COOM, —SO$_3$M, —OSO$_3$M, —P=O(OM)$_2$, —O—P=O(OM)$_2$ (wherein M represents a hydrogen atom, or an alkali metal salt), —OH, —NR$_2$, —N$^+$R$_3$ (R represents a hydrocarbon group), an epoxy group, —SH, —CN, etc. The polar group content is $10^{-1}$ to $10^{-8}$ mol/g, and preferably from $10^{-2}$ to $10^{-6}$ mol/g.

Specific examples of the binder used in the present invention include VAGH, VYHH, VMCH, VAGF, VAGD, VROH, VYES, VYNC, VMCC, XYHL, XYSG, PKHH, PKHJ, PKHC and PKFE (manufactured by Union Carbide Corporation), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Denki Kagaku Kogyo Kabushiki Kaisha), MR-104, MR-105, MR-110, MR-100, MR-555 and 400X-110A (manufactured by Nippon Zeon Corporation), Nippollan N2301, N2302 and N2304 (manufactured by Nippon Polyurethane Industry Co., Ltd.), Pandex T-5105, T-R3080 and T-5201, Burnock D-400, D-210-80, Crisvon 6109 and 7209 (manufactured by Dainippon Ink and Chemicals, Incorporated), Vylon UR8200, UR8300, UR8700, RV530 and RV280 (manufactured by Toyobo Co., Ltd.), Daiferamine 4020, 5020, 5100, 5300, 9020, 9022 and 7020 (manufactured by Dainichiseika Color & Chemicals Mfg. Co., Ltd.), MX5004 (manufactured by Mitsubishi Chemical Corp.), Sanprene SP-150 (manufactured by Sanyo Chemical Industries, Ltd.), and Saran F310 and F210 (manufactured by Asahi Kasei Corporation).

The amounts of binder used in the lower layer and the magnetic layer according to the present invention are in the range of 5 to 50 wt %, and preferably 10 to 30 wt %, based on the weight of the non-magnetic powder and the magnetic powder. When a vinyl chloride resin is used, the amount thereof is 5 to 30 wt %, when a polyurethane resin is used, the amount thereof is 2 to 20 wt %, the amount of polyisocyanate is 2 to 20 wt %, and they are preferably used in combination, but if, for example, head corrosion is caused by a slight degree of dechlorination, it is possible to use a polyurethane alone or a combination of a polyurethane and an isocyanate alone. When a polyurethane is used in the present invention, the polyurethane has a glass transition temperature of −50° C. to 150° C., and preferably 0° C. to 100° C., an elongation at break of 100% to 2,000%, a breaking stress of 0.5 to 100 MPa (0.05 to 10 kg/mm$^2$), and a yield point of 0.5 to 100 MPa (0.05 to 10 kg/mm$^2$).

The magnetic recording medium in the present invention may comprise two or more layers. Accordingly, the amount of binder, the contents of the vinyl chloride resin, polyurethane resin, polyisocyanate or other resin contained in the binder, the molecular weight of each of the resins forming the magnetic layer, the polar group content, and the above-mentioned physical properties of the resins, etc. can of course be varied in the lower layer and each magnetic layer as necessary, but it is better if these factors are optimized individually for the respective layers, and known techniques relating to multiple magnetic layers can be employed. For example, when the amount of binder is varied among the layers, increasing the amount of binder contained in the magnetic layer is effective in reducing scratches on the surface of the magnetic layer. For the purpose of improving the head contact, the amount of binder in the lower layer can be increased, thereby imparting flexibility.

Examples of the polyisocyanate used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with a polyalcohol; and polyisocyanates formed by an isocyanate condensation reaction. These isocyanates are commercially available under the trade names of Coronate L, Coronate HL, Coronate 2030, Coronate 2031, Millionate MR and Millionate MTL (manufactured by Nippon Polyurethane Industry Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Urethane Co., Ltd.). These isocyanates may be used in each of the layers, either singly or in combinations of two or more thereof, taking advantage of a difference in curing reactivity.

Carbon Black, Abrasive

Examples of the carbon black for use in the magnetic layer according to the present invention include furnace black for rubber, thermal black for rubber, black for coloring, and acetylene black. The carbon black preferably has a specific surface area of 5 to 500 m$^2$/g, a DBP oil absorption of 10 to 400 ml/100 g, an average particle size of 5 to 300 nm, a pH of 2 to 10, a water content of 0.1 to 10 wt %, and a tap density of 0.1 to 1 g/ml. Specific examples of the carbon black used in the present invention include BLACKPEARLS 2000, 1300, 1000, 900, 905, 800, and 700, and VULCAN XC-72 (manufactured by Cabot Corporation), #80, #60, #55, #50, and #35 (manufactured by Asahi Carbon Co., Ltd.), #2400B, #2300, #900, #1000, #30, #40 and #10B (manufactured by Mitsubishi Chemical Corporation), CONDUCTEX SC, RAVEN 150, 50, 40, and 15, and RAVEN-MT-P (manufactured by Columbia Carbon Co.), and Ketjen Black EC (manufactured by AKZONOBEL). The carbon black may be subjected to any of a surface treatment with a dispersant, etc., grafting with a resin, or a partial surface graphitization. The carbon black may also be dispersed in a binder prior to addition to a magnetic coating solution. The carbon black may be used alone or in a combination of different types thereof. The carbon black is preferably used in an amount of 0.1 to 30 wt % based on the amount of the magnetic material.

The carbon black has the functions of preventing static charging of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black for each of the magnetic upper layer and the lower layer according to the intended purpose on the basis of the above mentioned various properties such as the particle size, the oil absorption, the electroconductivity and the pH value, but it is better if they are optimized for the respective layers. Regarding carbon black for use in the magnetic layer of the present invention, for example, those described in the Carbon Black Handbook (edited by the Carbon Black Association of Japan) can be referred to.

With regard to abrasives used in the magnetic layer according to the present invention, known materials mainly having a Mohs hardness of 6 or above are used alone or in a combination thereof. Examples of the abrasive include α-alumina having an α-component proportion of 90% or above, β-alumina, silicon carbide, chromium oxide, cerium oxide, α-iron oxide, corundum, silicon nitride, silicon carbide, titanium carbide, titanium oxide, silicon dioxide, boron nitride, and diamond. A composite comprising these abrasives (formed by surface-treating an abrasive with another abrasive) may also be used. The abrasive may contain a compound or an element other than the main component in some cases, and the intended effect can be realized as long as the content of the main component is 90 wt % or above. The abrasive preferably has an average particle size of 0.01 to 2 μm and, in particular, for improving the electromagnetic conversion characteristics the abrasive preferably has a narrow particle size distribution. The durability can be improved by combining as necessary a plurality of abrasives having particle sizes that are different from each other, or employing a single abrasive having a wide particle size distribution, thus producing the same effect. The abrasive preferably has a tap density of 0.3 to 2 g/ml, a water content of 0.1 to 5 wt %, a pH of 2 to 11, and a specific surface area of 1 to 30 m$^2$/g. The form of the abrasive used in the present invention may be any of acicular, spherical and cuboidal, but those having a shape that in part includes an edge have high abrasiveness, which is preferable. Specific examples of the abrasive include AKP-12, AKP-15, AKP-20, AKP-30, AKP-50, HIT-20, HIT-30, HIT-55, HIT-60A, HIT-70, HIT-80, and HIT-100 (manufactured by Sumitomo Chemical Co., Ltd.), ERC-DBM, HP-DBM, and HPS-DBM (manufactured by Reynolds Corp.), WA10000 (manufactured by Fujimi Incorporated), UB20 (manufactured by C. Uyemura & CO., Ltd.), G-5, Kromex U2, and Kromex U1 (manufactured by Nippon Chemical Industry Co., Ltd.), TF100 and TF140 (manufactured by Toda Kogyo Corp.), β-Random Ultrafine (manufactured by Ibiden Co., Ltd.), and B-3 (manufactured by Showa Mining Co., Ltd.). These abrasives may be added to the lower layer, if necessary. The addition of an abrasive to the lower layer allows both the surface profile and the protruding state of the abrasive to be controlled. The particle size and the amount of an abrasive that is added to the magnetic layer or the lower layer should be set at optimal values.

Additive

As an additive that is used in the magnetic layer and the lower layer according to the present invention, one having a lubricating effect, an antistatic effect, a dispersing effect, a plasticizing effect, etc. may be used. Examples thereof include molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, an alkyl phosphate and an alkali metal salt thereof, an alkyl sulfate and an alkali metal salt thereof, polyphenyl ether, phenyl phosphonate, α-naphthylphosphoric acid, phenylphosphoric acid, diphenyl phosphate, p-ethylbenzenephosphonic acid, phenyl phosphite, aminoquinones, various types of silane coupling agents and titanium coupling agents, a fluorine-containing alkyl sulfate and an alkali metal salt thereof, a monobasic fatty acid having 10 to 24 carbons (which may contain an unsaturated bond and may be branched) and a metal salt thereof (with Li, Na, K, Cu, etc.), a mono-, di-, tri-, tetra-, penta- or hexa-hydric alcohol having 12 to 22 carbons (which may contain an unsaturated bond and may be branched), an alkoxy alcohol having 12 to 22 carbons (which may contain an unsaturated bond and may be branched), a mono-, di- or tri-fatty acid ester formed from a monobasic fatty acid having 10 to 24 carbons (which may contain an unsaturated bond and may be branched) and any one of mono-, di-, tri-, tetra-, penta- and hexa-hydric alcohols having 2 to 12 carbons (which may contain an unsaturated bond and may be branched), a fatty acid ester of a monoalkyl ether of an alkylene oxide polymer, a fatty acid amide having 8 to 22 carbons, and an aliphatic amine having 8 to 22 carbons.

Specific examples of the fatty acid include capric acid, caprylic acid, lauric acid, myristic acid, palmitic acid, stearic acid, behenic acid, oleic acid, elaidic acid, linolic acid, linolenic acid, and isostearic acid. Examples of the ester include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate; and examples of the alcohol include oleyl alcohol, stearyl alcohol and lauryl alcohol. Furthermore, examples of other additives that can be used include a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid, a phosphoric acid, a sulfate ester group, or a phosphate ester group; and an amphoteric surfactant such as an amino acid, an aminosulfonic acid, a sulfate ester or a phosphate ester of an amino alcohol, or an alkylbetain. Details of these surfactants are described in the 'Surfactant Handbook' (published by Sangyo Tosho Publishing). The lubricant, antistatic agent, etc. need not always be 100% pure and may contain, in addition to the main component, an impurity such as an isomer, an unreacted material, a byproduct, a decomposed product, or an oxide. However, the impurity content is preferably 30 wt % or below, and more preferably 10 wt % or below.

These lubricants and surfactants used in the present invention each have different physical functions. The types, amounts and proportions of a combination generating a synergistic effect thereof should be determined optimally according to the intended purpose. Examples of the synergistic effect include controlling bleeding out of the fatty acids to the surface by using fatty acids having different melting points from each other for the lower layer and the magnetic layer; controlling bleeding out of the esters to the surface by using esters having boiling points, melting points, and polarities that are different from each other; enhancing the coating stability by controlling the amount of surfactant; and enhancing the lubricating effect by increasing the amount of lubricant in the lower layer, but the examples are by no means limited thereto. In general, the total amount of the lubricants is 0.1 to 50 wt %, and preferably from 2 to 25 wt %, based on the weight of the ferromagnetic metal powder in the magnetic layer or the non-magnetic powder in the lower layer.

All or a part of the additives used in the present invention may be added to a magnetic coating solution or a non-magnetic coating solution at any stage of its preparation. For example, an additive may be blended with a magnetic material before a kneading step; it may be added during the kneading step involving the magnetic material, a binder, and a solvent; it may be added during a dispersing step; it may be added after the dispersing step; or it may be added immediately before coating. Depending on the intended purpose, the purpose might be achieved by coating a part or all of the additives simultaneously with the magnetic layer or in succession after coating the magnetic layer. Depending on the intended purpose, the lubricant may be coated on the surface of a magnetic layer after a calendering treatment (heating and subjecting to pressure by means of calender rolls) or after completion of slitting.

The organic solvent that can be used in the present invention may be any known solvent and, for example, a solvent disclosed in JP-A-6-68453 can be used.

Layer Construction

The thickness of the support in the magnetic recording medium of the present invention is 4 to 10 μm, and preferably 7 to 9 μm.

An undercoat layer may be provided between the support and the lower layer for the purpose of improving the adhesion. The thickness of this undercoat layer is generally 0.005 to 0.5 μm, and preferably 0.01 to 0.5 μm.

In the present invention, the lower layer and the magnetic layer are provided on one side of the support, the other side of the support is provided with a back layer, and the thickness of this back layer is generally 0.1 to 1 μm, and preferably 0.3 to 0.7 μm. A known undercoat layer and back layer can be used for this purpose.

The thickness of the magnetic layer of the magnetic recording medium of the present invention can be optimally selected according to the saturation magnetization of the head used, the head gap length, and the recording signal zone, and is preferably 0.01 to 0.6 μm, and more preferably 0.05 to 0.3 μm. The magnetic layer may comprise two or more layers each having different magnetic characteristics, and a known multiple magnetic layer structure can be applied to the present invention.

The thickness of the lower layer of the magnetic recording medium according to the present invention is generally 0.2 to 5.0 μm, preferably 0.3 to 3.0 μm, and more preferably 0.5 to 1.5 μm.

Support

The support used in the present invention is preferably non-magnetic. As a non-magnetic support, known films can be used. Examples thereof include polyesters such as polyethylene terephthalate and polyethylene naphthalate; polyolefins; cellulose triacetate; polycarbonates; polyamides (including aliphatic polyamides and aromatic polyamides such as aramid); polyimides; polyamideimides; polysulfones; and polybenzoxazole. A high-strength support such as polyethylene naphthalate or a polyamide is preferably used. If necessary, a laminate type support as disclosed in JP-A-3-224127 can be used so as to change the surface roughness of the magnetic layer surface and the base surface. The support may be subjected in advance to a corona discharge treatment, a plasma treatment, an adhesion promotion treatment, a heat treatment, a dust removal treatment, etc.

To attain the object of the present invention, it is preferable to use a support having a center plane average roughness (SRa) of 8.0 nm or below, and more preferably 4.0 nm or below, as measured by a TOPO-3D optical interference surface roughness meter (manufactured by WYKO Corporation). It is preferable not only that the support has a small center plane average roughness but also that it is free from coarse protrusions of 0.3 μm or above. The surface roughness profile can be controlled freely by the size and amount of a filler added as necessary to the support. Examples of the filler include acrylic-based organic powders, as well as oxides and carbonates of Ca, Si, and Ti. The support preferably has a maximum height of protrusions present on the surface of the support (SRmax) of 1 μm or below, a ten-point average roughness (SRz) of 0.5 μm or below, a center plane peak height (SRp) of 0.5 μm or below, a center plane valley depth (SRv) of 0.5 μm or below, a center plane area factor (SSr) of 10% to 90%, and an average wavelength (S$\lambda$a) of 5 to 300 μm. To obtain desired electromagnetic conversion characteristics and durability, the surface protrusion distribution of the support can be controlled freely by the filler, and the number of protrusions having a size of 0.01 to 1 μm can each be controlled so as to be in the range of 0 to 2,000 per 0.1 mm$^2$.

The F-5 value of the non-magnetic support used in the present invention is preferably 50 to 500 MPa (5 to 50 kg/mm$^2$), and the thermal shrinkage of the support at 80° C. for 30 minutes is preferably 0.5% or below, and more preferably 0.2% or below. Its breaking strength is preferably 50 to 1,000 MPa (5 to 100 kg/mm$^2$).

Production Method

A process for producing a magnetic coating solution and a lower layer coating solution for the magnetic recording medium of the present invention comprises at least a kneading step, a dispersion step and, optionally, a blending step that is carried out prior to and/or subsequent to the abovementioned steps. Each of these steps may be composed of two or more separate stages. All materials including the ferromagnetic metal powder, the non-magnetic powder, the binder, the carbon black, the abrasive, the antistatic agent, the lubricant, and the solvent used in the present invention may be added in any step from the beginning or during the course of the step. The addition of each material may be divided across two or more steps. For example, a polyurethane can be divided and added in a kneading step, a dispersing step, and a blending step for adjusting the viscosity after dispersion. To attain the object of the present invention, a conventionally known production technique may be employed as a part of the steps. In the kneading step, it is preferable to use a powerful kneading machine such as an open kneader, a continuous kneader, a pressure kneader or an extruder. When a kneader is used, all or a part of the binder (preferably 30 wt % or above of the entire binder) is kneaded with the magnetic powder or non-magnetic powder in the range of 15 parts to 500 parts by weight of the binder relative to 100 parts by weight of the magnetic powder or non-magnetic powder. Details of this kneading treatment are disclosed in JP-A-1-106338 and JP-A-1-79274. For the dispersion of a magnetic layer solution and a lower layer solution, glass beads can be used, but a dispersing medium having a high specific gravity such as zirconia beads, titania beads, or steel beads is suitably used. An optimal particle size and packing density of these dispersing media should be selected. A known dispersing machine can be used.

The following methods are preferably used for coating the magnetic recording medium having a multilayer structure of the present invention. As a first method, a lower layer is coated by a gravure coating, roll coating, blade coating, extrusion coating device, etc. that is generally used for a magnetic coating solution, and an upper layer is coated while the lower layer is still in a wet state by means of a pressurized support type extrusion coating device disclosed in JP-B-1-46186, JP-A-60-238179, and JP-A-2-265672. As a second method, an upper layer and a lower layer are coated substantially simultaneously using a coating head equipped with two slits for feeding a coating solution as disclosed in JP-A-63-88080, JP-A-2-17971 and JP-A-2-265672. As a third method, an upper layer and a lower layer are coated substantially simultaneously using an extrusion coating device equipped with a backup roll as disclosed in JP-A-2-174965. In order to prevent degradation of the electromagnetic conversion characteristics, etc. of the magnetic recording medium due to aggregation of magnetic particles, it is desirable to impart shear to the coating solution within the coating head by a method as described in JP-A-62-95174 and JP-A-1-236968. With respect to the viscosity of the coating solutions, it is necessary for it to lie within the range of values disclosed in JP-A3-8471. In order to realize the constitution of the present invention, a sequential multilayer-coating method in which a magnetic layer is coated on top of a lower layer that has been coated and dried can of course be used without impairing the effect of the present invention. However, in order to reduce coating defects and improve the quality of aspects such as dropouts, it is preferable to use the above-mentioned simultaneous multilayer-coating method, and more preferably a simultaneous dual-coating method.

In the present invention, it is preferable to use a known orientation device involving, for example, applying an alternating magnetic field using a rare-earth type magnet and a solenoid.

The use of heat resistant plastic rolls such as epoxy, polyimide, polyamide or polyimideamide, or metal rolls, is preferred for the calendering treatment. The treatment temperature is preferably 80° C. or above, and more preferably 85° C. to 95° C. The line pressure is preferably 2,000 N/cm (200 kg/cm) or above, and more preferably 3,000 N/cm (300 kg/cm) to 4,500 N/cm (450 kg/cm).

Physical Properties

The saturation magnetic flux density of the magnetic layer of the magnetic recording medium according to the present invention is generally from 200 mT (2,000 G) to 600 mT (6,000 G) when a ferromagnetic metal powder is used. The distribution in coercive force is preferably narrow. The SFD is preferably 3.0 or below. The squareness ratio is 0.8 or above.

It can be easily anticipated that the physical properties of the lower layer and the magnetic layer of the magnetic recording medium of the present invention can be varied according to the intended purpose. For example, the elastic modulus of the magnetic layer can be made higher, thereby improving the transport durability, and at the same time the elastic modulus of the lower layer can be made lower than that of the magnetic layer, thereby improving contact of the magnetic recording medium with the head.

The present invention can provide a magnetic tape cassette housing a high-recording-density magnetic recording medium having high output and an extremely small number of retries by means of a 2 reel type magnetic tape cassette housing reels around which is wound a magnetic recording medium comprising a support, a non-magnetic layer comprising a non-magnetic powder and a binder on one surface of the support, a magnetic layer comprising a ferromagnetic metal powder and a binder on top of the non-magnetic layer, and a back layer comprising a carbon black powder and a binder on the other side of the support, wherein the magnetic tape cassette further comprises a rotating guide roller made of a resin within the cassette, the roller being in contact with the surface of the magnetic layer; the ten-point average roughness Rz of the rotating guide roller being 3.0 to 4.5 µm; and the center plane average roughness SRa of the magnetic layer being 2.0 to 3.5 nm.

EXAMPLE

The present invention is described in detail below with reference to specific examples, but it should not be construed as being limited thereto. Hereinafter, 'parts' means 'parts by weight'.

The properties of the magnetic materials used in the examples are described below.

Example 1

Preparation of Coating Solution

| Upper layer coating solution | |
|---|---|
| Ferromagnetic metal powder | 100 parts |
| Composition: Fe/Co = 70/30 (atomic ratio) | |
| Al/Fe = 11 atom %, Y/Fe = 7 atom % | |
| Hc = 195 kA/m (2,450 Oe), average major axis length = 0.08 µm, | |
| $\sigma_s$ = 145 A · m$^2$/kg (145 emu/g) | |
| Crystallite size = 150 Å, Specific surface area $S_{BET}$ = 53 m$^2$/g | |

| -continued | |
|---|---|
| Vinyl chloride copolymer | 10 parts |
| MR110 (manufactured by Nippon Zeon Corporation) | |
| Polyurethane resin | 3 parts |
| UR 8200 (manufactured by Toyobo Co., Ltd.) | |
| Carbon black | 3 parts |
| #50 (manufactured by Asahi Carbon Co., Ltd.) | |
| Phenyl phosphonate | 3 parts |
| Butyl stearate | 2 parts |
| Butoxyethyl stearate | 3 parts |
| Neopentyl glycol | 3 parts |
| Stearic acid | 1 part |
| Methyl ethyl ketone | 180 parts |
| Cyclohexanone | 110 parts |
| Lower layer coating solution | |
| Non-magnetic powder | 100 parts |
| α-Iron oxide | |
| BET specific surface area: 50 m$^2$/g | |
| pH: 8.4 | |
| DBP oil absorption: 27 to 38 g/100 g | |
| Amount of Al$_2$O$_3$ present on the surface: 1 wt % relative to the entire particle | |
| Carbon black | 13 parts |
| #950B (manufactured by Mitsubishi Chemical Corporation) | |
| Vinyl chloride copolymer | |
| MR110 (manufactured by Nippon Zeon Corporation) | 17 parts |
| Polyurethane resin | 6 parts |
| UR8200 (manufactured by Toyobo Co., Ltd.) | |
| Phenyl phosphonate | 3 parts |
| Butyl stearate (BS) | 3 parts |
| Butoxyethyl stearate (BES) | 4 parts |
| Neopentyl glycol (NPG) | 4 parts |
| Oleic acid | 1 part |
| Stearic acid | 1 part |
| Methyl ethyl ketone | 200 parts |
| Cyclohexanone | 50 parts |

Each of the above-mentioned coating solution compositions was mixed in a kneader, an α-alumina paste (HIT60A, manufactured by Sumitomo Chemical Co., Ltd.) dispersed in a vinyl chloride copolymer (MR110, manufactured by Nippon Zeon Corporation) was added to each of the dispersions for the upper and lower layers so that the amount of α-alumina was 5 parts; furthermore, 5 parts of a polyisocyanate was added to the upper layer dispersion and 13 parts of the polyisocyanate was added to the lower layer dispersion; 40 parts of cyclohexanone was further added to each thereof, and they were filtered through a filter having an average pore diameter of 3 µm to give coating solutions for forming the upper layer and the lower layer.

Support

As a support, polyethylene naphthalate having a thickness of 8.5 µm and a center plane average roughness SRa of 4.0 nm was used.

Simultaneous multilayer-coating was carried out on one side of the support by coating the lower layer coating solution obtained above at a dry thickness of 1.5 µm and immediately after that coating the magnetic layer on top thereof at a thickness of 0.2 µm; while the coated sample was still wet the coating was subjected to orientation by means of an orientation device employing a rare-earth type magnet having a magnetic field strength of 600 mT (6,000 G) and a solenoid having a magnetic field strength of 400 mT (4,000 G), and then dried. A known back layer coating solution comprising a carbon black powder and a binder was coated on the other side of the support and dried to give a thickness of 0.5 µm. The sample was subsequently treated using a 7-stage calender at a line pressure of 3,300 N/cm (330 kg/cm) at 80° C. using metal rolls, slit into ½ inch widths, subjected to surface polishing and then wound around a DTF2 reel manufactured by Sony Corporation.

The properties of the magnetic material and the magnetic tape prepared above were evaluated by the following measurement methods, and the results are given in Table 1.

Measurement Method (1) Output

A signal having a single frequency of 42.65 MHz corresponding to a recording wavelength λ of 0.315 μm was recorded on the test sample (magnetic recording tape) using a recording/playback device (GY-8240, DTF2 drive, manufactured by Sony Corporation). The signal was played back and measured using a spectrum analyzer (TR4171, manufactured by Advantest Corporation), and the output (units: dB) was determined as the difference between the output (dB) from the test sample and that from a standard tape (GW2-200GL, commercial magnetic tape for DTF2, manufactured by Sony Corporation) using the equation below.

Output (dB)=output from test sample (dB)−output from standard tape (dB)

(2) Number of Retries

A recording/playback device (DIR-240 drive, manufactured by Sony Corporation) was used. An internal signal of the drive was recorded on the test sample (magnetic recording tape) over the whole tape length, and the whole tape length was played back and rewound 100 times. The recorded signal was then played back over the whole tape length, the occurrence of C2 errors within the drive was counted, and the total was defined as the number of retries.

TABLE 1

|  | Example | | Comparative Example | | | |
|---|---|---|---|---|---|---|
|  | 1 | 2 | 1 | 2 | 3 | 4 |
| Magnetic layer SRa (nm) | 3.3 | 2.2 | 1.8 | 4.5 | 2.2 | 2.2 |
| Rotating guide roller Rz (μm) | 3.0 | 4.5 | 3.0 | 3.0 | 2.5 | 5.0 |
| Coefficient of friction | 0.17 | 0.19 | 0.38 | 0.15 | 0.25 | 0.18 |
| Output (dB) | +1.0 | +1.5 | +1.9 | −3.5 | +1.4 | +1.6 |
| Number of retries (times/200GB) | 5 | 8 | 250 | 50 | 130 | 100 |

Example 2

A tape was prepared under the same conditions as those of Example 1 except that calendering was carried out at 90° C. with a line pressure of 4,000 N/cm (400 kg/cm), and the same rotating guide roller as in Example 1 was used except that the surface of the rotating guide roller had been subjected to surface roughening by cutting machining.

Comparative Example 1

A tape was prepared under the same conditions as those of Example 1 except that calendering was carried out at 100° C. with a line pressure of 5,000 N/cm (500 kg/cm).

The coefficient of friction was high, there was much debris from the edges due to transport, and the number of retries increased.

Comparative Example 2

A tape was prepared under the same conditions as those of Example 1 except that calendering was carried out at 70° C. with a line pressure of 3,000 N/cm (300 kg/cm).

The SRa of the magnetic surface increased, the output decreased, and the number of retries therefore increased.

Comparative Example 3

A tape was prepared under the same conditions as those of Example 2 except that the surface of the rotating guide roller was subjected to barrel finishing so as to reduce the Rz.

The coefficient of friction was high, there was much debris from the edges, and the number of retries thus increased.

Comparative Example 4

A tape was prepared under the same conditions as those of Example 2 except that the surface of the rotating guide roller was subjected to cutting machining so as to increase the Rz.

The surface of the magnetic layer was scratched, and the number of retries increased.

What is claimed is:

1. A magnetic tape cassette of a two reel type comprising a reel around which a magnetic recording medium is wound, the magnetic recording medium comprising a support, a non-magnetic layer comprising a non-magnetic powder and a binder on one surface of the support, a magnetic layer comprising a ferromagnetic metal powder and a binder on top of the non-magnetic layer, and a back layer comprising a carbon black powder and a binder on the other side of the support, said magnetic tape cassette further comprising:

a rotating guide roller made of a resin within the cassette, the roller being in contact with the surface of the magnetic layer;

the ten-point average roughness Rz of the rotating guide roller being 3.0 to 4.5 μm; and the center plane average roughness SRa of the magnetic layer being 2.0 to 3.5 nm.

2. The magnetic tape cassette according to claim 1, wherein the rotating guide roller has been subjected to surface roughing by cutting the surface of the rotating guide roller.

3. The magnetic tape cassette according to claim 1, wherein the rotating guide roller has been subjected to surface roughing by machining grooves in the surface of the rotating guide roller.

4. The magnetic tape cassette according to claim 1, wherein the cassette is equipped with a pair of rotating guide rollers.

5. The magnetic tape cassette according to claim 1, wherein the rotating guide roller is formed from polyoxymethylene.

6. The magnetic tape cassette according to claim 1, further comprising a bearing pin projectingly provided in the lower half of the magnetic tape cassette, wherein the rotating guide roller is rotatably supported by movably fitting the bearing pin into a central hole of the rotating guide roller.

7. The magnetic tape cassette according to claim 1, wherein the ferromagnetic metal powder is a ferromagnetic alloy powder having α-Fe as a main component.

8. The magnetic tape cassette according to claim 7, wherein the ferromagnetic metal powder contains, in addition to α-Fe, at least one element selected from Co, Y, Al, Nd and Sm.

9. The magnetic tape cassette according to claim 1, wherein the BET specific surface area of the ferromagnetic metal powder is 45 to 80 $m^2/g$.

10. The magnetic tape cassette according to claim 1, wherein the non-magnetic layer comprises a resin, and a powder selected from an inorganic powder and an organic powder, the powder being dispersed in the resin.

11. The magnetic tape cassette according to claim 1, wherein the thickness of the support is 4 to 10 μm.

12. The magnetic tape cassette according to claim 1, wherein the support is selected from polyethylene terephthalate, polyethylene naphthalate, polyamides and polyimides.

13. The magnetic tape cassette according to claim 1, wherein the support has a center plane average roughness (SRa) of 8.0 nm or below.

14. The magnetic tape cassette according to claim 1, wherein the support includes a filler selected from oxides and carbonates of Ca, Si, and Ti and acrylic-based organic powders.

15. The magnetic tape cassette according to claim 1, wherein the support has a maximum height of protrusions present on the surface of the support (SRmax) of 1 μm or below, a ten-point average roughness (SRz) of 0.5 μm or below, a center plane peak height (SRp) of 0.5 μm or below, a center plane valley depth (SRv) of 0.5 μm or below, a center plane area factor (SSr) of 10% to 90%, and an average wavelength (Sλa) of 5 to 300 μm.

16. The magnetic tape cassette according to claim 1, wherein the F-5 value of the support is 50 to 500 MPa (5 to 50 kgf/mm$^2$).

17. The magnetic tape cassette according to claim 1, wherein the magnetic tape has been subjected to a calendering treatment, the temperature of the treatment being 80° C. or above.

18. The magnetic tape cassette according to claim 1, wherein the magnetic tape has been subjected to a calendering treatment, the line pressure of the treatment being 3,000 N/cm (300 kgf/cm) to 4,500N/cm (450 kgf/cm).

* * * * *